(12) United States Patent
Tofukuji et al.

(10) Patent No.: US 12,174,098 B2
(45) Date of Patent: Dec. 24, 2024

(54) TISSUE PIECE TREATING APPARATUS

(71) Applicants: SAKURA SEIKI CO., LTD., Nagano (JP); SAKURA FINETEK JAPAN CO., LTD., Tokyo (JP)

(72) Inventors: Tadashi Tofukuji, Nagano (JP); Takeshi Tsukada, Nagano (JP)

(73) Assignees: SAKURA SEIKI CO., LTD., Nagano (JP); SAKURA FINETEK JAPAN CO., LTD., Tokyo (JP)

( * ) Notice: Subject to any disclaimer, the term of this patent is extended or adjusted under 35 U.S.C. 154(b) by 704 days.

(21) Appl. No.: 17/429,915

(22) PCT Filed: Nov. 13, 2019

(86) PCT No.: PCT/JP2019/044495
§ 371 (c)(1),
(2) Date: Aug. 10, 2021

(87) PCT Pub. No.: WO2020/170516
PCT Pub. Date: Aug. 27, 2020

(65) Prior Publication Data
US 2022/0136939 A1    May 5, 2022

(30) Foreign Application Priority Data
Feb. 20, 2019    (JP) .................................. 2019-028346

(51) Int. Cl.
*G01N 1/36*    (2006.01)
(52) U.S. Cl.
CPC ...................................... *G01N 1/36* (2013.01)
(58) Field of Classification Search
CPC ...................................................... G01N 1/36
See application file for complete search history.

(56) References Cited

U.S. PATENT DOCUMENTS

| 2002/0131896 | A1 | 9/2002 | Hunnell | |
| 2007/0086917 | A1* | 4/2007 | Lemme | G01N 1/312 |
| | | | | 422/63 |
| 2011/0039328 | A1* | 2/2011 | Minemura | G01N 1/31 |
| | | | | 435/286.5 |

FOREIGN PATENT DOCUMENTS

| CN | 207002218 U | * | 2/2018 |
| EP | 1913360 A2 | | 4/2008 |

(Continued)

OTHER PUBLICATIONS

CN-207002218-U English translation obtained from ip.com (Year: 2024).*

(Continued)

*Primary Examiner* — Jennifer Wecker
*Assistant Examiner* — Jonathan Bortoli
(74) *Attorney, Agent, or Firm* — William Thomas Babbitt, Esq.

(57) ABSTRACT

A tissue piece treating apparatus including a treating tank; a plurality of storage containers in each of which a paraffin bottle for storing a paraffin is housed; a constant temperature rack that houses the storage containers, and heats the paraffin to hold the paraffin in a molten state; and a paraffin pipeline that branches from the treating tank, in which in the storage containers, a treatment container in which the paraffin to be transported to the treating tank is housed and a standby container in which the paraffin not to be transported to treating tank is housed, are disposed, and the paraffin pipeline is connected to the paraffin bottle to be housed in the treatment container.

6 Claims, 4 Drawing Sheets

(56) References Cited

FOREIGN PATENT DOCUMENTS

| | | |
|---|---|---|
| EP | 2327974 A1 | 6/2011 |
| JP | 65840138 A | 3/1983 |
| JP | H1090146 A | 4/1998 |
| JP | 2000346767 A | 12/2000 |
| JP | 2003028769 A | 1/2003 |
| JP | 2005221511 A | 8/2005 |
| JP | 2015001512 A | 1/2015 |

OTHER PUBLICATIONS

Sakura Seiki Co., Ltd., et al, Related Application, European Application No. 19916407, PCT/JP2019044495, The Extended Euroepan Search Report, Nov. 17, 2021.

Sakura Seiki Co., Ltd. and Sakura Finetek Japan Co., Ltd., Related Application, PCT International Patent Application No. PCT/JP2019/044495; International Search Report; Dated Feb. 18, 2020.

* cited by examiner

TISSUE PIECE TREATING APPARATUS

CROSS-REFERENCE TO RELATED APPLICATIONS

The present Application is a national stage of International Patent Application No. PCT/JP2019/044495, titled "Tissue Processing Apparatus," filed Nov. 13, 2019, which claims priority from Japanese Patent Application No. 2019-028346, filed Feb. 20, 2019, the contents of which are incorporated in this disclosure by reference in their entirety.

TECHNICAL FIELD

The present invention relates to a tissue piece treating apparatus, and more specifically relates to a tissue piece treating apparatus that performs treatment necessary for producing a microscopic specimen of a tissue piece collected from a living thing including a human body.

BACKGROUND ART

As a pretreatment for observing a tissue piece (sample) collected from a living thing with a microscope, specimen production treatment in which fixing treatment, dehydrating treatment, degreasing treatment, and permeating treatment are performed in this order is performed. A tissue piece treating apparatus that automatically performs the treatment has been widely used (see, PTL 1: JP-A-2015-1512).

The specimen production treatment is performed in such a manner that a tissue piece is successively immersed into a chemical solution or paraffin in accordance with each treatment. In the tissue piece treating apparatus, to an inside of a treating tank in which a tissue piece is housed, chemical solutions of different types and concentrations are supplied from respective chemical solution bottles in a prescribed order and paraffin with different concentrations are then supplied from the respective storage containers in a prescribed order, and the chemical solutions and the paraffin are respectively held in a certain period of time. Therefore, the tissue piece is immersed into the chemical solution or the paraffin in accordance with each treatment inside the treating tank, thereby performing the specimen production treatment. Note that, the chemical solutions and the paraffin supplied to the treating tank are respectively returned to original chemical solution bottles or storage containers, and are repeatedly used for the immersion treatment until it is determined that the chemical solutions and the paraffin are unavailable.

All of the chemical solutions that are used in the abovementioned immersion treatment are liquid at ambient temperature, but the paraffin is a solid at ambient temperature, and thus cannot be used unless the paraffin is heated to be converted into a liquid. Accordingly, the tissue piece treating apparatus is configured to be provided with a constant temperature rack capable of heating and holding an inside thereof at a constant temperature, and to directly house paraffin with different concentrations in a plurality of storage containers that are disposed to the inside of the constant temperature rack. Therefore, the paraffin is held in a molten (liquid) state and is used for the immersion treatment.

SUMMARY OF INVENTION

Technical Problem

However, there has been such a problem in the conventional configuration that when paraffin housed in the storage container is replaced and the paraffin in the molten state is erroneously spilled, the tissue piece treating apparatus and the floor may get dirty, and a worker may suffer burns because the paraffin comes into contact with a body of the worker. Moreover, there has been another problem that paraffin to be newly injected into the inside of the storage container is a solid, so that immersion treatment (permeating treatment for the paraffin) cannot be performed until the paraffin is heated to become a molten state.

Solution to Problem

The present invention has been accomplished under the abovementioned circumstances, and aims to provide a tissue piece treating apparatus capable of preventing paraffin from spilling and coming into contact with a body of a worker when the paraffin is replaced, and performing immersion treatment immediately after the paraffin has been replaced.

The present invention solves the problem by a solution as described below, as one embodiment.

A tissue piece treating apparatus according to the present invention needs to have such a configuration that the tissue piece treating apparatus is provided with: a treating tank in which a tissue piece is housed, and immersion of the tissue piece is performed by a chemical solution and paraffin being supplied thereto; a plurality of storage containers in each of which a paraffin bottle for storing the paraffin is housed; a constant temperature rack that houses the storage containers, and heats the paraffin in each paraffin bottle to hold the paraffin in a molten state; and a paraffin pipeline that branches from the treating tank to be connected to a part of the paraffin bottles, in which in the storage containers, a treatment container in which the paraffin to be transported to the treating tank is housed and a standby container in which the paraffin not to be transported to the treating tank is housed, are disposed, and the paraffin pipeline is connected to the paraffin bottle to be housed in the treatment container.

Accordingly, paraffin can be replaced in units of the paraffin bottle in which a predetermined amount of paraffin is stored in advance, and the replaced paraffin can be immediately discarded while being kept in the paraffin bottle. Accordingly, paraffin can be easily replaced, compared with the conventional configuration in which paraffin is directly housed in the storage container. Moreover, paraffin can be replaced in a state where the paraffin is stored in the paraffin bottle, in other words, a state where the paraffin is not exposed, so that the paraffin can be prevented from spilling, scattering, and coming into contact with the body of the worker.

In addition, the paraffin bottle that stores therein solid paraffin can be housed in advance in the standby container, and the paraffin can be caused to melt and wait (be retained). Accordingly, when the paraffin is replaced, immersion treatment can be immediately performed by housing the paraffin bottle having been caused to wait in the treatment container.

Moreover, the paraffin bottle is preferably provided with a window part through which an inside of the paraffin bottle can be visually identified from an outside thereof. Accordingly, the remaining quantity or dirt or the like in the paraffin bottle can be visually checked.

Moreover, preferably: the paraffin bottle includes an opening part to which the paraffin pipeline is connected; a connection unit is disposed to a connection site with the opening part, in the paraffin pipeline; the connection unit includes a blockage lid that blocks the opening part, and a tubular pipe that extends by penetrating through the blockage lid; and the blockage lid is provided with an air discharge port that constantly communicates the inside of the paraffin bottle with the outside thereof. Accordingly, the paraffin pipeline and the paraffin bottle can be easily attached to and detached from each other, and the paraffin can be transported to the treating tank by being passed through from the tubular pipe to the treating tank. Moreover, air that is transported from the inside of the treating tank to the inside of the paraffin bottle can be discharged from the air discharge port, which can prevent the air from filling inside and the paraffin bottle from bursting.

Moreover, as another example of the tissue piece treating apparatus according to the present invention, a tissue piece treating apparatus needs to have such a configuration that the tissue piece treating apparatus is provided with: a treating tank in which a tissue piece is housed, and immersion of the tissue piece is performed by a chemical solution and paraffin being supplied thereto; a plurality of storage containers in each of which a paraffin bottle for storing the paraffin is housed; a constant temperature rack that houses the storage containers, and heats the paraffin in each paraffin bottle to hold the paraffin in a molten state; and a paraffin pipeline that branches from the treating tank to be connected to all of the paraffin bottles, in which the paraffin pipeline includes a selection valve that is provided with a plurality of selection ports, and is operated by control of a control unit, the selection ports are connected on a one-to-one basis to all of the paraffin bottles, and thus are configured so as to allow paraffin in the one paraffin bottle selected from the plurality of the paraffin bottles to be supplied to and discharged from an inside of the treating tank, and the control unit is configured to perform the control of selecting the desired paraffin bottle from the paraffin bottles excluding the paraffin bottle having been most recently housed in the storage container, with respect to the selection valve.

Accordingly, the paraffin can be molten and caused to wait (be retained) in the storage container to which the paraffin has been most recently injected. The paraffin bottle that stores therein the paraffin determined as to be unusable is then taken out from the storage container, and a new paraffin bottle is housed (connected to the selection port), so that the storage container that houses the paraffin caused to wait can be used for the immersion treatment. As a result, it is possible to perform the immersion treatment immediately after the paraffin is replaced. In addition, paraffin can be easily replaced, compared with the conventional configuration in which paraffin is directly housed in the storage container, and the paraffin can be prevented from spilling, scattering, and coming into contact with the body of the worker.

Advantageous Effects of Invention

With the present invention, paraffin can be prevented from spilling and coming into contact with a body of a worker when the paraffin is replaced, and immersion treatment can be performed immediately after the paraffin has been replaced.

DESCRIPTION OF EMBODIMENTS

Figure 1:
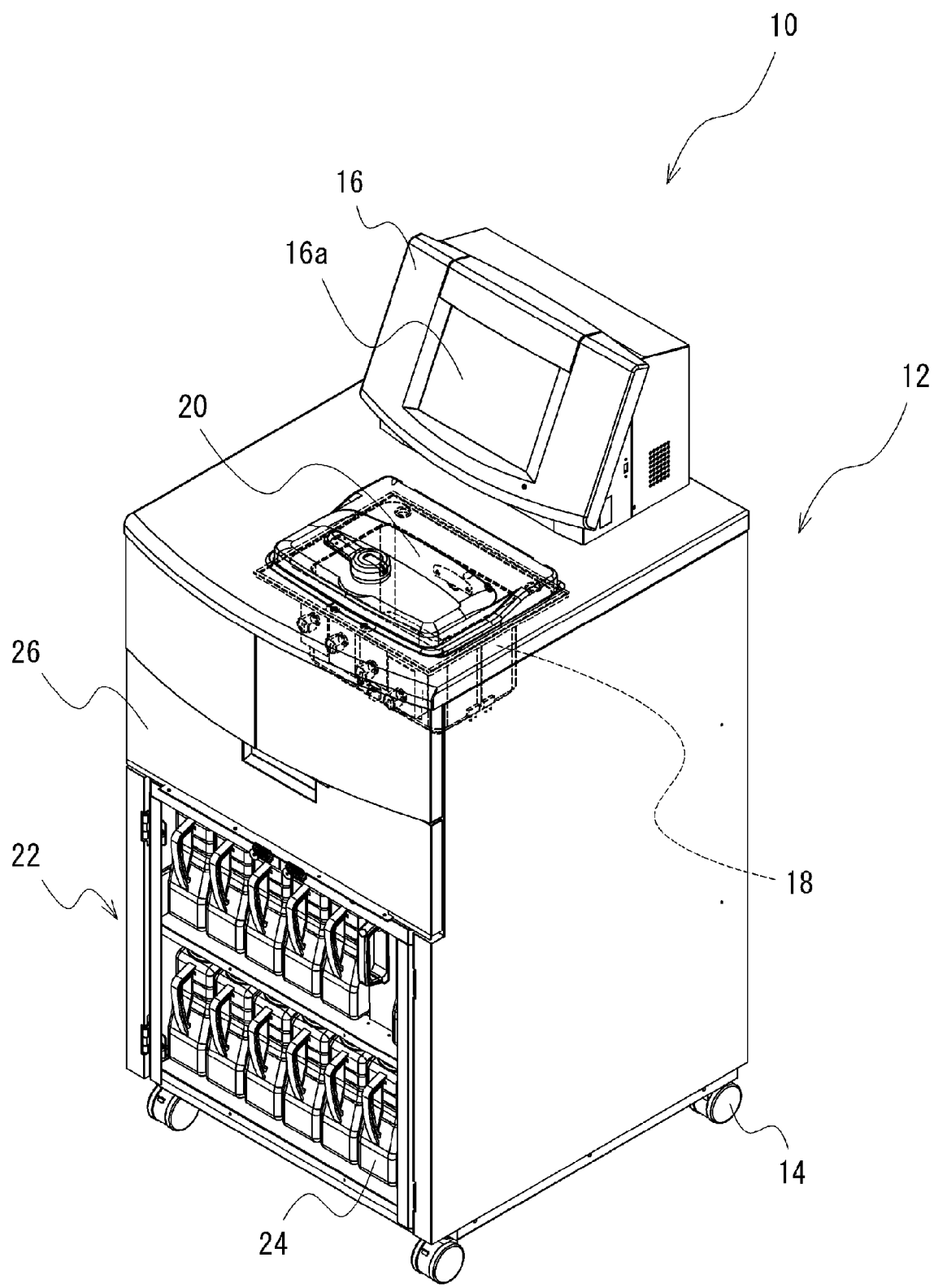
FIG. 1 is a schematic view (perspective view) illustrating an example of a tissue piece treating apparatus according to an embodiment of the present invention.
Figure 2:
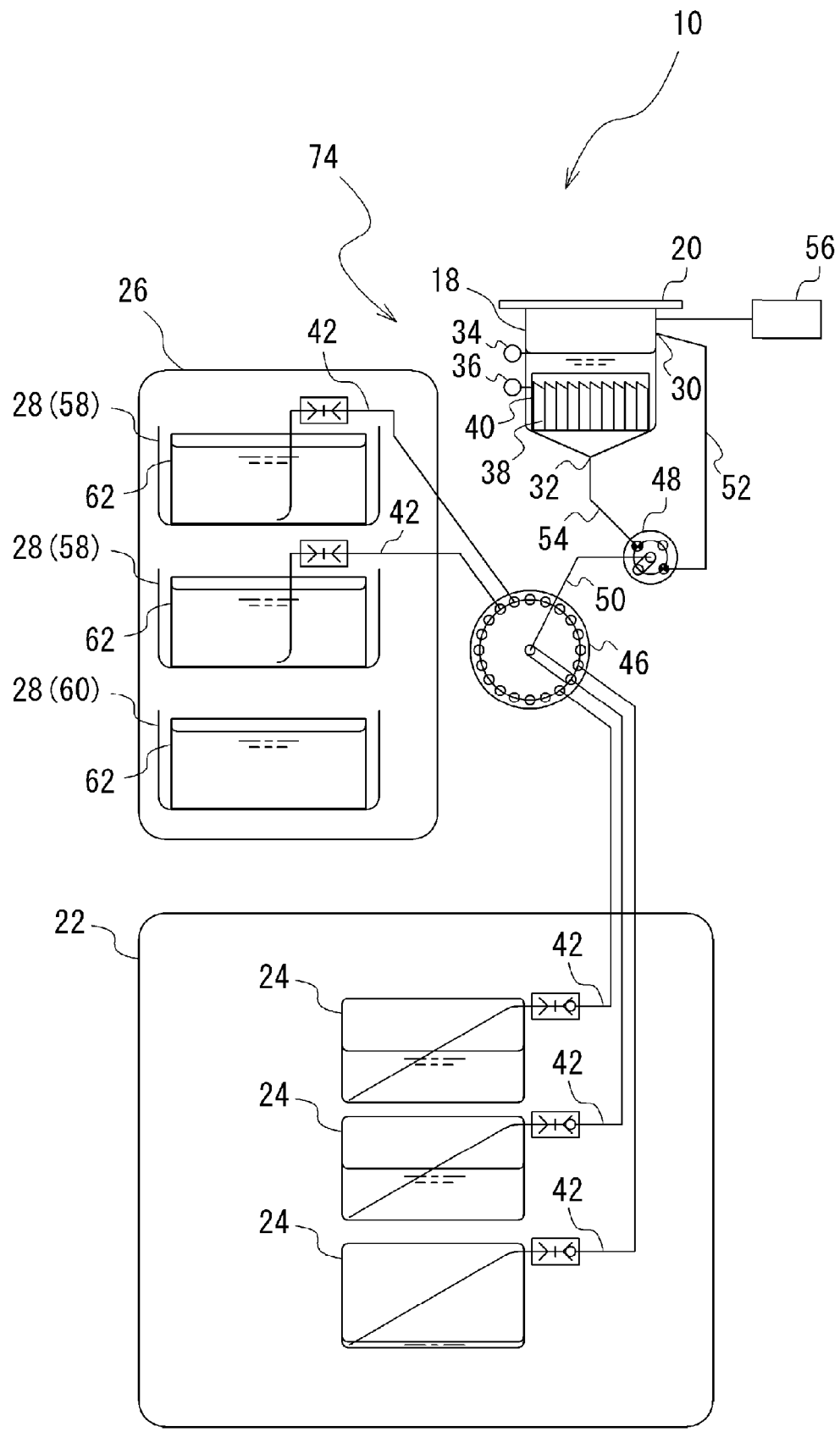
FIG. 2 is a schematic diagram (system diagram) illustrating an example of the tissue piece treating apparatus according to the embodiment of the present invention.
Figure 3:
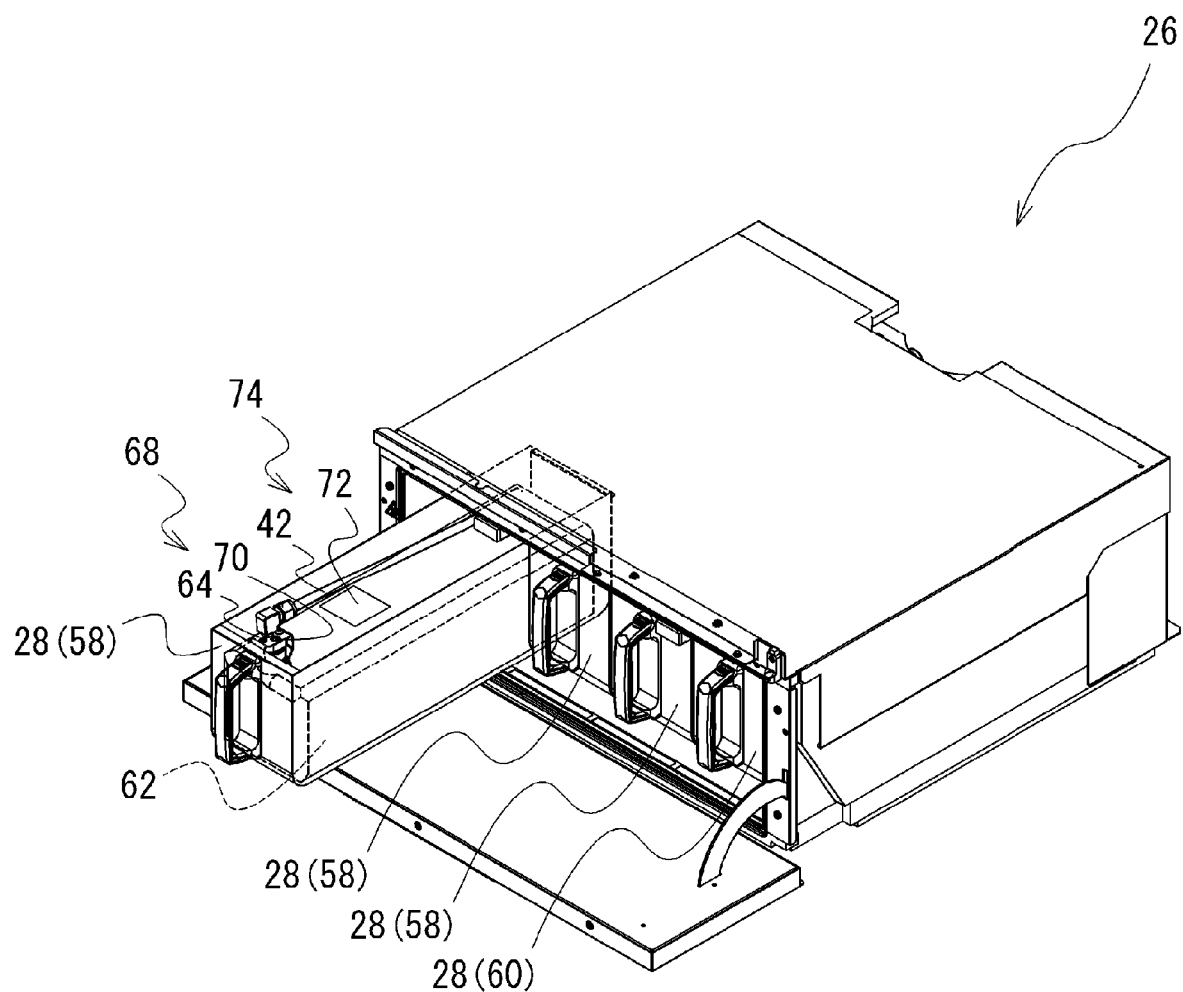
FIG. 3 is a schematic view (perspective view) illustrating a configuration example of a constant temperature rack in the tissue piece treating apparatus according to the embodiment of the present invention.
Figure 4:
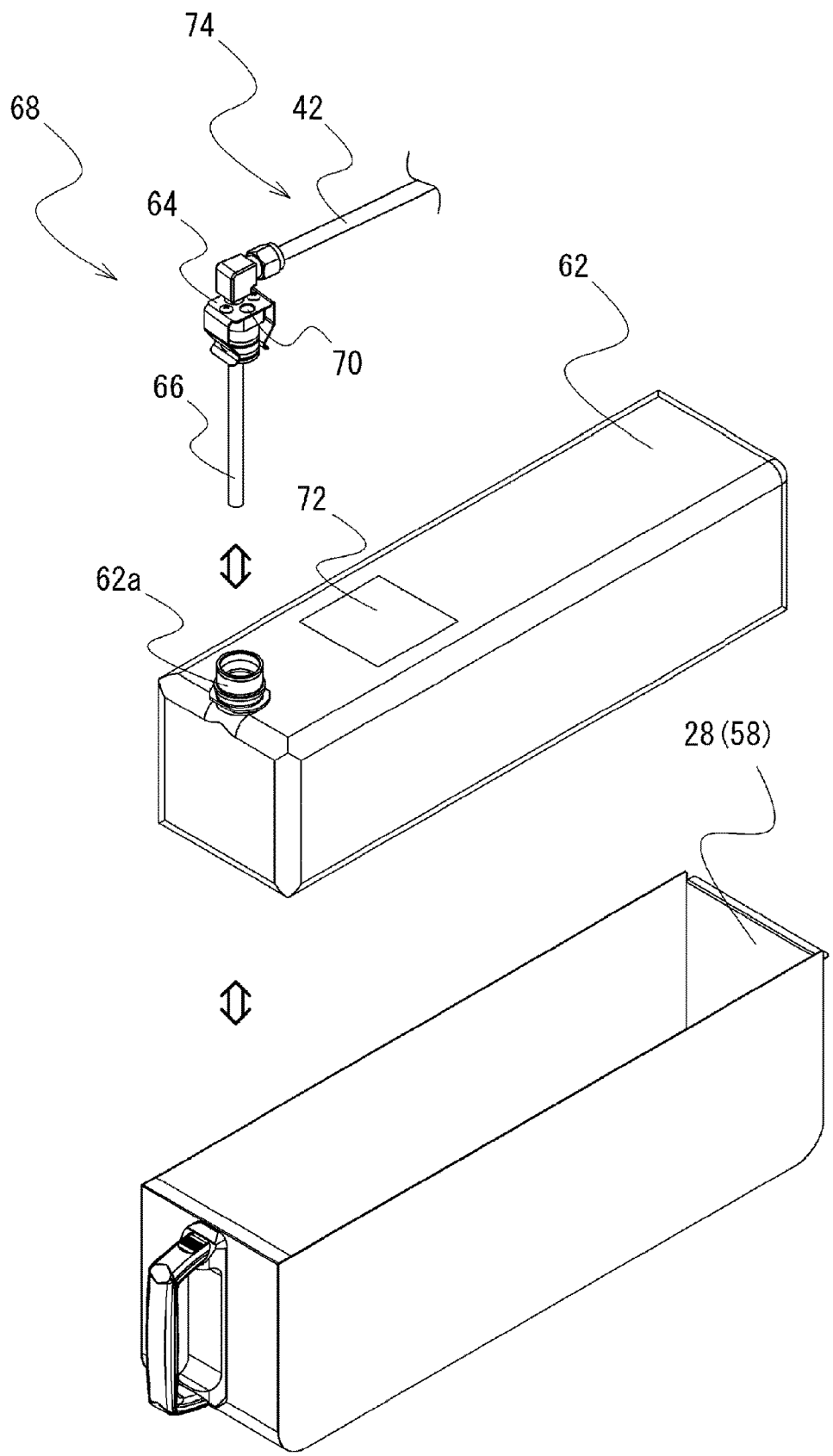
FIG. 4 is a schematic view (perspective view) illustrating a configuration example of a storage container and a paraffin bottle in the tissue piece treating apparatus according to the embodiment of the present invention.

Hereinafter, an embodiment of the present invention will be described in detail with reference to the drawings. FIG. 1 is a schematic view (perspective view) illustrating an example of a tissue piece treating apparatus 10 according to an embodiment of the present invention. Moreover, FIG. 2 is a schematic diagram (system diagram) illustrating an example of the tissue piece treating apparatus 10 according to the embodiment of the present invention. Moreover, FIG. 3 is a schematic view (perspective view) illustrating a configuration example of a constant temperature rack 26 in the tissue piece treating apparatus 10 according to the embodiment of the present invention. FIG. 4 is a schematic view (perspective view) illustrating a configuration example of a storage container 28 (treatment container 58) and a paraffin bottle 62 in the tissue piece treating apparatus according to the embodiment of the present invention. In all the drawings, elements having the same function are assigned with the same reference numerals and repeated explanations thereof are omitted in some cases. Note that, "a chemical solution is supplied to and discharged from an inside of a treating tank 18" indicates that a chemical solution is supplied from an inside of a chemical solution bottle 24 to an inside of a treating tank 18, and the chemical solution is then discharged from the inside of the treating tank 18 to the inside to the chemical solution bottle 24. Moreover, "paraffin is supplied to and discharged from the inside of the treating tank 18" indicates that paraffin is supplied from an inside of the paraffin bottle 62 to the inside of the treating tank 18, and the paraffin is then discharged from the inside of the treating tank 18 to the inside of the paraffin bottle 62.

The tissue piece treating apparatus 10 according to the present embodiment (hereinafter, simply mentioned as "apparatus 10" in some cases) is an apparatus that automatically performs treatment necessary for producing a microscopic specimen of a tissue piece collected from a living thing including a human body. The tissue piece treating apparatus 10 illustrated in FIG. 1 is configured so as to be movable by mounting arbitrary casters 14 to a rectangular main body unit 12. A monitor 16 on which a setting screen, ongoing treatment, or the like, is displayed as one example, and a touch panel or the like is arbitrarily mounted, is provided to a top surface of the main body unit 12, and is arranged such that a display surface 16a is directed at a front surface of the main body unit 12 that faces a worker. Moreover, on the top surface of the main body unit 12, an opening/closing lid 20 that opens and closes an opening part in an upper portion of the treating tank 18 that is built into the main body unit 12 is mounted. Note that, the treating tank 18 is generally called "retort", and the opening/closing lid 20 is called generally "retort lid".

Moreover, the main body unit 12 is provided with a bottle rack 22 of a plurality of stages (two stages in the present embodiment) at a lower portion in an inside thereof. In the bottle rack 22, a plurality of the chemical solution bottles 24 that respectively store therein chemical solutions of different types are disposed, and a plurality of the chemical solution bottles 24 that store therein chemical solutions with different concentrations in the chemical solutions of the same type are also disposed. Therefore, when immersion treatment using chemical solutions of the same type is performed for a plurality of times, chemical solutions can be respectively supplied from the different chemical solution bottles 24 to the inside of the treating tank 18, and can be respectively returned to the different original chemical solution bottles 24. As a result, the respective chemical solution bottles 24 with different concentrations are selectively used in accordance with a burden (the extent of the assumed concentration reduction) with each immersion treatment, so that the concentration of the chemical solution in the chemical solution bottle 24 can be adjusted, and the number of use times of the chemical solution can be increased as a whole. Note that, the number of the chemical solution bottles 24, which are disposed in plurality, is not limited to a prescribed number (for example, the number illustrated in FIG. 1 or 2). Moreover, the raw material, the shape, the size, and the like of the chemical solution bottle 24 are not limited.

Moreover, the main body unit 12 is provided with the constant temperature rack 26 that can heat and hold the inside at a constant temperature (as one example, about 60[° C.]), in the central portion in an inside thereof. In the present embodiment, a plurality of the storage containers 28 are housed in the constant temperature rack 26, and the paraffin bottles 62 that respectively store therein paraffin with different concentrations are further stored in the respective storage containers 28. This allows the paraffin in the paraffin bottle 62 to be heat and held in the molten state. Moreover, immersion treatment using paraffin is performed for a plurality of times, paraffin can be supplied from each of the different paraffin bottles 62 to the inside of the treating tank 18, and can be returned to each of the original paraffin bottles 62. As a result, the respective paraffin bottles 62 with different concentrations are selectively used in accordance with a burden (the extent of the assumed concentration reduction) with each immersion treatment, so that the concentration of the paraffin in each of the paraffin bottles 62 can be adjusted, and the number of use times of the paraffin can be increased as a whole. The configuration of the constant temperature rack 26 will be described in details after the overall configuration of the apparatus 10 is described. Note that, the constant temperature rack 26 is generally called "oven".

Moreover, the main body unit 12 is provided with the treating tank 18 in an upper portion in the inside thereof, as described above. The treating tank 18 illustrated in FIG. 2 is a container in which a tissue piece is housed, and immersion of the tissue piece is performed by a chemical solution and paraffin being supplied thereto. In an inner surface thereof, a supply inlet 30 through which a chemical solution is supplied opens in a side surface, and a discharge port 32 from which the chemical solution is discharged opens in a bottom surface. Moreover, a liquid level sensor 34 that senses the liquid level in the inside of the treating tank 18, and a concentration sensor 36 that measures the concentration of the liquid in the inside of the treating tank 18, are disposed. Moreover, a heater (which is not illustrated) that heats the treating tank 18 is externally provided. In addition, a pump 56 (air pump) is connected via a pipeline. The pump 56 has a function of sucking the gas in the inside of the treating tank 18 to decompress the inside of the treating tank 18 to be a negative pressure, and jetting the air to the inside of the treating tank 18 to pressurize the inside of the treating tank 18 to be a positive pressure. Note that, each one or several tissue pieces are typically housed in a small-sized container 38, one or a plurality of the small-sized containers 38 are then housed in a storage container 40, and one or a plurality of the storage containers 40 are housed in the treating tank 18. Therefore, tissue pieces collected from a plurality of human bodies and the like are housed in the treating tank 18 by being divided and housed into the small-sized containers 38 to which information related to the tissue pieces are attached, so that specimen production treatment can be simultaneously performed. Note that, the small-sized container 38 is generally called "cassette", and the storage container 40 is generally called "basket".

In addition, the main body unit 12 is provided with, as illustrated in FIG. 2, a selection valve 46 in which a plurality of selection ports 42 are provided, in an inside thereof. The selection ports 42 are respectively connected on a one-to-one basis to all of the chemical solution bottles 24 and a part of the paraffin bottles 62 that are housed in the storage container 28 (specifically, the treatment container 58, which is described later). As the selection valve 46, as one example, a rotary valve can be considered. Moreover, the selection valve 46 is connected to the treating tank 18 via a switching valve 48. The switching valve 48, which is a three-way valve, is connected via a central port 50 to the selection valve 46, is connected via a supply port 52 to the supply inlet 30 that opens in the side surface of the treating tank 18, and is connected via a discharge port 54 to the discharge port 32 that opens in the bottom surface of the treating tank 18. Note that, any of the pump 56, the selection valve 46, and the switching valve 48 having been described in the foregoing are configured to be operated by the control by a control unit (which is not illustrated).

With the above configuration, one chemical solution or paraffin in the chemical solution bottle 24 or the paraffin bottle 62 selected from the plurality of the chemical solution bottles 24 or the paraffin bottles 62 is capable of being supplied to and discharged from the inside of the treating tank 18. Specifically, in a case of paraffin as one example, the desired paraffin bottle 62 is selected by the operation of the selection valve 46, and a paraffin pipeline 74 from the paraffin bottle 62 to the treating tank 18 is opened by the switching of the switching valve 48. In this process, the inside of the treating tank 18 is decompressed by the pump 56, whereby paraffin in the paraffin bottle 62 is supplied (transported) to the inside of the treating tank 18. Next, the pipeline between the treating tank 18 and the selection valve 46 is closed by the switching of the switching valve 48, whereby paraffin can be stored in the inside of the treating tank 18 and the tissue piece can be immersed. Next, the desired paraffin bottle 62 (typically, the original paraffin bottle 62) is selected by the operation of the selection valve 46, and the paraffin pipeline 74 from the inside of the treating tank 18 to the paraffin bottle 62 is opened by the switching of the switching valve 48. In this process, the inside of the treating tank 18 is pressurized by the pump 56, whereby the paraffin in the inside of the treating tank 18 can be discharged (transported) to the paraffin bottle 62. In this manner, the paraffin can be supplied to and discharged from the inside of the treating tank 18. Moreover, similarly, the desired chemical solution bottle 24 is selected by the operation of the selection valve 46, whereby the chemical solution can be supplied to and discharged from the inside of the treating tank 18. In addition, the supplying and discharging processes (immersion treatment) are performed in a prescribed order by the control of the control unit (which is not illustrated), whereby specimen production treatment for a tissue piece can be performed.

Next, the configuration of the constant temperature rack 26 that is characteristic in the present invention will be described in details. Firstly, as described above, a plurality of the storage containers 28 are housed in the constant temperature rack 26 in the present embodiment, and the paraffin bottles 62 that respectively store therein paraffin with different concentrations are further stored in the respective storage containers 28 (see FIGS. 3 and 4). Accordingly, paraffin can be replaced by replacing the paraffin bottle 62.

In the conventional configuration, paraffin has been directly housed in each of the storage containers 28. The paraffin has been replaced in such a manner that a disposal container is further provided as appropriate outside the constant temperature rack 26, paraffin having been determined as to be unavailable is transported to the disposal container, solidified, and then discarded, and new paraffin is injected into (added to) the storage container 28 having stored the paraffin. Accordingly, when paraffin is replaced, there has been a possibility that the paraffin remaining in the storage container 28 is spilled and scattered, and comes into contact with a body of a worker to cause the worker to suffer burns. Moreover, after the solid paraffin has been injected into the storage container 28, molten paraffin overflows from the storage container 28, and conversely, further supply of paraffin is necessary because paraffin is insufficient, so that the work has become troublesome.

In contrast, with the configuration according to the present embodiment, paraffin can be replaced in a state where the paraffin is stored in the paraffin bottle 62, in other words, a state where the paraffin is not exposed, so that the paraffin can be prevented from spilling, scattering, and coming into contact with the body of the worker. Moreover, paraffin can be replaced in units of the paraffin bottle 62 in which a predetermined amount of the paraffin is stored in advance, and the replaced paraffin can be immediately discarded independent of the state (solid or liquid) while being kept in the paraffin bottle 62. Accordingly, paraffin can be easily replaced, compared with the conventional configuration in which paraffin is directly housed in the storage container 28. Moreover, the configuration in which no disposal container for transporting and solidifying the replaced paraffin is provided can be employed, so that the entire apparatus 10 can be downsized.

Note that, the number of the paraffin bottles 62, which are disposed in plurality, is not limited to a prescribed number (for example, the number illustrated in FIG. 2 or 3). Moreover, the raw material, the shape, the size, and the like of the paraffin bottle 62 are not limited. Herein, the paraffin bottle 62 is provided with a window part 72 through which the inside of the paraffin bottle 62 can be visually identified from an outside thereof (see FIGS. 3 and 4), as an arbitrary configuration. Therefore, the remaining quantity or dirt or the like in the paraffin bottle 62 can be visually checked. The position, the size, and the number of the window parts 72 are not limited, and as one example, a configuration or the like in which a part of or the whole of the paraffin bottle 62 is configured as to be transparent or translucent to form the window part 72 can be considered.

Next, in the storage container 28 illustrated in FIG. 3, the treatment container 58 in which paraffin to be transported to the treating tank 18 is housed and a standby container 60 in which paraffin not to be transported to the treating tank 18 is housed, are disposed. This allows solid paraffin (the paraffin bottle 62) to be housed in advance in the standby container 60, the paraffin to be molten, and the paraffin in the molten state to be caused to wait (be retained) in the standby container 60. When paraffin is then replaced, immersion treatment can be immediately performed by housing the paraffin in the molten state (the paraffin bottle 62) having been caused to wait in the standby container 60, in the treatment container 58. Note that, as one example, any of the storage containers 28 may be formed in the same shape. Therefore, replacement of the paraffin bottle 62 between the storage containers 28 can be performed by, in addition to the replacement of the paraffin bottle 62, the replacement of the storage container 28.

Herein, in the present embodiment, such a configuration is employed that the paraffin pipeline 74 that connects the treating tank 18 to the paraffin bottle 62 is a pipeline that branches off to a plurality of the selection ports 42 from the treating tank 18 via the selection valve 46, and is connected to a part of the paraffin bottles 62. In other words, the paraffin pipeline 74 (the selection port 42) is connected only to the paraffin bottle 62 that is housed in the treatment container 58. Therefore, only the paraffin that is housed in the treatment container 58 can be transported to the treating tank 18, and can be used for the immersion treatment.

Meanwhile, as another example, it can be also considered such a configuration (which is not illustrated) that the paraffin pipeline 74 is a pipeline that branches off from the treating tank 18, and is connected to all of the paraffin bottles, in other words, the paraffin bottles 62 that are housed in all of the storage containers 28. In this case, specifically, the selection ports 42 are connected on a one-to-one basis to all of the paraffin bottles 62, so that paraffin in one paraffin bottle 62 selected from the plurality of the paraffin bottle 62 is configured so as to be capable of being supplied to and discharged from the inside of the treating tank 18. In addition, as one example, it can be considered such a configuration that the control of the control unit (which is not illustrated) causes the selection valve 46 to select the desired paraffin bottle 62 from the paraffin bottles 62 excluding the paraffin bottle 62 most recently housed in the storage container 28. With this example, the storage container 28 to which paraffin is most recently injected can be substantially functioned as the standby container 60, and the paraffin can be molten in the storage container 28 and can be caused to wait (be retained). Moreover, the paraffin bottle 62 that stores therein the paraffin determined as to be unusable is then taken out from the storage container, and a new paraffin bottle 62 is housed (connected to the selection port 42). Therefore, the storage container 28 that houses the paraffin bottle 62 having been caused to wait is used in the immersion treatment, and can be caused to substantially function as the treatment container 58. As a result, it is possible to perform the immersion treatment immediately after the paraffin is replaced.

Next, as for the connection between the paraffin bottle 62 and the paraffin pipeline 74, the paraffin bottle 62 illustrated in FIG. 4 includes an opening part 62a on an upper portion thereof, and the opening part 62a and the paraffin pipeline 74 (the selection port 42) are detachably connected to each other. Specifically, a connection unit 68 including a blockage lid 64 that blocks the opening part 62a, and a tubular pipe 66 that extends by penetrating through the blockage lid 64, is provided in a connection site with the opening part 62a in the paraffin pipeline 74 (the selection port 42). Therefore, by removing a lid (which is not illustrated) of the opening part 62a of the paraffin bottle 62 and mounting the blockage lid 64 of the connection unit 68 thereto instead, the paraffin pipeline 74 (the selection port 42) and the paraffin bottle 62 can be easily mounted to and removing from each other. Moreover, when the blockage lid 64 of the connection unit 68 is attached to the opening part 62a of the paraffin bottle 62, the tubular pipe 66 can be inserted into the paraffin in the inside of the paraffin bottle 62, so that the paraffin can be transported to the treating tank 18 by being passed from the tubular pipe 66 to the treating tank 18.

Note that, in the blockage lid 64 of the connection unit 68 illustrated in FIG. 4, as an arbitrary configuration, an air discharge port 70 that constantly communicates between the inside and the outside of the paraffin bottle 62 is provided. Therefore, when paraffin in the inside of the treating tank 18 is returned to the paraffin bottle 62, the air that is transported to the inside of the paraffin bottle 62 after the paraffin can be caused to discharge from the air discharge port 70. This can prevent the air from filling inside and the paraffin bottle 62 from bursting. The position, the size, and the number of the air discharge ports 70 is not limited, however, the configuration in which paraffin is difficult to be spilled when the apparatus 10 is inclined due to an earthquake and the like is preferable.

As has been described in the foregoing, with the tissue piece treating apparatus according to the present invention, paraffin can be replaced in units of the paraffin bottle in which a predetermined amount of paraffin has been stored in advance, and the replaced paraffin can be immediately discarded while being kept in the paraffin bottle. Accordingly, paraffin can be easily replaced, compared with the conventional configuration in which paraffin is directly housed in the storage container. Moreover, paraffin can be replaced in a state where the paraffin is stored in the paraffin bottle, in other words, a state where the paraffin is not exposed, so that the paraffin can be prevented from spilling, scattering, and coming into contact with the body of the worker.

In addition, the paraffin bottle that stores therein solid paraffin can be housed in the storage container in advance, and the paraffin can be caused to melt and wait (be retained). Accordingly, it is possible to perform the immersion treatment immediately after the paraffin is replaced.

Note that, the present invention is not limited to the examples having been described above, but various changes can be made without deviating from the scope of the present invention.

What is claimed is:

1. A tissue piece treating apparatus comprising:
a treating tank configured to house a tissue piece, and to immerse the tissue piece with a chemical solution and paraffin being supplied to the tissue piece;
a plurality of storage containers in each of which a paraffin bottle for storing paraffin is housed, wherein the storage containers comprise at least one treatment container in which paraffin to be transported to the treating tank is housed and at least one standby container in which paraffin not to be transported to the treating tank is housed;
a constant temperature rack configured to house the plurality of storage containers, and to heat the paraffin in each paraffin bottle to hold the paraffin in a molten state; and
a paraffin pipeline branching from the treating tank and is configured to connected connect to a paraffin bottle housed in the at least one treatment container exclusive of a paraffin bottle housed in the at least one standby container.

2. The tissue piece treating apparatus according to claim 1, wherein each paraffin bottle comprises a window part through which an inside of each paraffin bottle can be visually identified from an outside thereof.

3. The tissue piece treating apparatus according to claim 1, wherein each paraffin bottle includes an opening part to which the paraffin pipeline is operable to be connected, the apparatus further comprising:
a connection unit disposed in a connection site of the paraffin pipeline wherein the opening part of a paraffin bottle in the at least one treatment container is connectable with the paraffin pipeline, wherein the connection unit includes a blockage lid blocking the opening part, and a tubular pipe extending by penetrating through the blockage lid, the blockage lid is comprising an air discharge port constantly communicating an inside of the paraffin bottle with an outside thereof.

4. A tissue piece treating apparatus, comprising:
a treating tank configured to house a tissue piece, and to immerse the tissue piece with a chemical solution and paraffin being supplied to the tissue piece;
a plurality of storage containers in each of which a paraffin bottle for storing paraffin is housed;
a constant temperature rack that houses the plurality of storage containers, and is configured to heat the paraffin in each paraffin bottle to hold the paraffin in a molten state; and
a paraffin pipeline branching from the treating tank and configured to connect to each of the paraffin bottles, and
a control unit, wherein
the paraffin pipeline includes a selection valve comprising a plurality of selection ports wherein the control unit is configured to control the selection valve, wherein the plurality of selection ports are configured to connect on a one-to-one basis to respective ones of each paraffin bottle wherein the paraffin pipeline is configured to selectively discharge paraffin from an inside of the treating tank and to supply paraffin to the inside of the treating tank based on an operation of the selection valve, and wherein the control unit is configured to select a desired paraffin bottle from only the paraffin bottles in which paraffin in the molten state is housed with respect to the selection valve.

5. The tissue piece treating apparatus according to claim 4, wherein each paraffin bottle comprises a window part through which an inside of each paraffin bottle can be visually identified from an outside thereof.

6. The tissue piece treating apparatus according to claim 4, wherein each paraffin bottle includes an opening part to which the paraffin pipeline is configured to connect, and the tissue piece treating apparatus further comprising:
a plurality of connection units disposed in the paraffin pipeline and connecting a respective connection unit on a one-to-one basis to the opening part of each paraffin bottle, wherein each connection unit includes a blockage lid blocking the opening part, and a tubular pipe extending by penetrating through the blockage lid, and each blockage lid comprising an air discharge port constantly communicating an inside of each paraffin bottle with an outside thereof.

* * * * *